(12) United States Patent
Asazawa et al.

(10) Patent No.: US 9,130,222 B2
(45) Date of Patent: Sep. 8, 2015

(54) HYDRAZINE FIXING DETECTION SYSTEM

(75) Inventors: Koichiro Asazawa, Shiga (JP); Koji Yamada, Shiga (JP); Hirohisa Tanaka, Shiga (JP)

(73) Assignee: DAIHATSU MOTOR CO., LTD., Osaka (JP)

( * ) Notice: Subject to any disclaimer, the term of this patent is extended or adjusted under 35 U.S.C. 154(b) by 424 days.

(21) Appl. No.: 12/733,446

(22) PCT Filed: Sep. 4, 2008

(86) PCT No.: PCT/JP2008/065965
§ 371 (c)(1),
(2), (4) Date: Mar. 2, 2010

(87) PCT Pub. No.: WO2009/034913
PCT Pub. Date: Mar. 19, 2009

(65) Prior Publication Data
US 2010/0221643 A1    Sep. 2, 2010

(30) Foreign Application Priority Data

Sep. 13, 2007 (JP) .................................. 2007-238280

(51) Int. Cl.
*H01M 8/22* (2006.01)
*H01M 8/04* (2006.01)

(52) U.S. Cl.
CPC ............ *H01M 8/222* (2013.01); *H01M 8/0444* (2013.01); *H01M 8/04194* (2013.01);
(Continued)

(58) Field of Classification Search
CPC ...... H01M 8/04186–8/04216; H01M 8/04447; H01M 8/04798; H01M 8/222; H01M 8/04194
USPC ................................................ 429/449, 504
See application file for complete search history.

(56) References Cited

U.S. PATENT DOCUMENTS

| | | |
|---|---|---|
| 3,542,597 A | 11/1970 | Smith et al. |
| 3,592,694 A | 7/1971 | Urbach et al. |
| 4,493,878 A | 1/1985 | Horiba et al. |
| 2002/0025461 A1 | 2/2002 | Shimada |
| 2004/0025808 A1 | 2/2004 | Cheng |

(Continued)

FOREIGN PATENT DOCUMENTS

| | | |
|---|---|---|
| EP | 0181569 A2 | 5/1986 |
| EP | 0181569 A3 | 5/1986 |

(Continued)

OTHER PUBLICATIONS

Asazawa, K., Yamada, K., Tanaka, H., Oka, A., Taniguchi, M. and Kobayashi, T. (2007), A Platinum-Free Zero-Carbon-Emission Easy Fuelling Direct Hydrazine Fuel Cell for Vehicles. Angew. Chem. Int. Ed., 46: 8024-8027. doi:10.1002/anie.200701334; Article first published online Sep. 13, 2007.*

(Continued)

*Primary Examiner* — Barbara Gilliam
*Assistant Examiner* — Robert S. Carrico
(74) *Attorney, Agent, or Firm* — Jean C. Edwards, Esq.; Edwards Neils PLLC (57) ABSTRACT

A fuel cell system of the present invention includes a fixing unit that fixes or releases hydrazine, a fuel cell to which hydrazine released in the fixing unit is supplied as fuel, a supply line for supplying an aqueous hydrazine solution from a hydrazine supply source to the fixing unit, a drain line for draining drained water from the fixing unit, a first sensing unit for detecting a hydrazine concentration in an aqueous hydrazine solution flowing in the supply line, a second sensing unit for detecting a hydrazine concentration in drained water flowing in the drain line, and a detection unit that detects the amount of hydrazine fixed in the fixing unit based on the concentration values detected by the first sensing unit and the second sensing unit.

4 Claims, 3 Drawing Sheets

(52) U.S. Cl.
CPC ...... *H01M 8/04201* (2013.01); *H01M 8/04208* (2013.01); *H01M 8/04798* (2013.01); *H01M 2250/20* (2013.01); *Y02E 60/50* (2013.01); *Y02T 90/32* (2013.01)

(56) References Cited

U.S. PATENT DOCUMENTS

| | | |
|---|---|---|
| 2005/0095465 A1 | 5/2005 | Tanaka et al. |
| 2005/0112417 A1 | 5/2005 | Oshima et al. |
| 2005/0136247 A1 | 6/2005 | Sumiya et al. |
| 2005/0266281 A1 | 12/2005 | Adams et al. |
| 2006/0063058 A1 | 3/2006 | Kurachi |
| 2006/0263655 A1 | 11/2006 | Schaevitz et al. |
| 2008/0026267 A1 | 1/2008 | Rikihisa et al. |
| 2009/0317670 A1 | 12/2009 | Taniguchi et al. |
| 2009/0318662 A1 | 12/2009 | Taniguchi et al. |

FOREIGN PATENT DOCUMENTS

| | | |
|---|---|---|
| EP | 1705740 | 9/2006 |
| EP | 1843416 | 10/2007 |
| EP | 2 042 524 A1 | 4/2009 |
| JP | 58-186170 | 10/1983 |
| JP | 2001-213605 | 8/2001 |
| JP | 2001-266915 | 9/2001 |
| JP | 2004-127659 | 4/2004 |
| JP | 2006-32063 | 2/2006 |
| JP | 2006-79838 | 3/2006 |
| JP | 2006-156086 | 6/2006 |
| JP | 2006-236969 | 9/2006 |
| JP | 2006-244961 | 9/2006 |
| WO | WO 03/056649 | 7/2003 |
| WO | WO 2008/007650 A1 | 1/2008 |
| WO | WO 2008/007651 | 1/2008 |

OTHER PUBLICATIONS

Asazawa, Koichiro et al., "A Platinum-Free Zero-Carbon-Emission Easy Fuelling Direct Hydrazine Fuel . . . ", Angew. Chem. Int. Ed., 2007, 46 pp. 8024-8027, Weinheim, Germany.

European Search Report issued on Aug. 6, 2014 in connection with European Patent Application No. 08831206.1.

* cited by examiner

HYDRAZINE FIXING DETECTION SYSTEM

CROSS-REFERENCE TO RELATED APPLICATIONS

The present invention is a 35 U.S.C. 371 national stage entry of PCT/JP2008/065965, filed Sep. 4, 2008, which claims priority from Japanese Patent Application No. 2007-238280, filed Sep. 13, 2007, the contents of all of which are herein incorporated by reference in their entirety.

TECHNICAL FIELD

The present invention relates to a fuel cell system in which hydrazine is used as fuel.

BACKGROUND ART

There has been proposed a direct fuel supply-type fuel cell in which hydrazine is directly supplied as fuel to a fuel-side electrode (see, for example, Patent Documents 1 and 2).

In the fuel cell of Patent Documents 1 and 2, only nitrogen is generated at the fuel-side electrode and no carbon dioxide is generated as in direct methanol fuel cell, so that zero emission is substantially achieved.

Patent Document 1 Japanese Unexamined Patent Publication No.2006-244961

Patent Document 2 International Publication WO 2003/056649

DISCLOSURE OF THE INVENTION

Problem to be Solved by the Invention

However, hydrazine, which is fuel, may cause fire and explosion, and because it is strongly alkaline, careful handling is required.

Furthermore, it is necessary that a fuel cell be designed efficiently and economically as a system, taking the method for supplying fuel into account.

An object of the present invention is to provide a fuel cell system that can be designed as an efficient and economic system while achieving safe use of hydrazine in a fuel cell in which hydrazine is used as fuel.

Means for Solving the Problem

To achieve the above object, the fuel cell system of the present invention includes a fixing unit that fixes or releases hydrazine, a fuel cell to which hydrazine released in the fixing unit is supplied as fuel, a supply line for supplying an aqueous hydrazine solution from a hydrazine supply source to the fixing unit, a drain line for draining drained water from the fixing unit, a first sensing unit for detecting a hydrazine concentration in an aqueous hydrazine solution flowing in the supply line, a second sensing unit for detecting a hydrazine concentration in drained water flowing in the drain line, and a detection unit that detects an amount of hydrazine fixed in the fixing unit based on the concentration values detected by the first sensing unit and the second sensing unit.

In the fuel cell system of the present invention, it is preferable that the detection unit determines that hydrazine fixed in the fixing unit is full when the concentration value detected by the first sensing unit and the concentration value detected by the second sensing unit are the same.

Furthermore, in the fuel cell system of the present invention, it is preferable that the drain line is a reflux line for refluxing drained water from the fixing unit to the hydrazine supply source.

Effects of the Invention

In the fuel cell system of the present invention, hydrazine that is supplied to the fixing unit can be fixed in the fixing unit until being supplied to the fuel cell, and therefore hydrazine can be stored stably. As a result, hydrazine can be used safely.

Further, in the fuel cell system of the present invention, the first sensing unit is provided on the supply line, and the second sensing unit is provided on the drain line. Furthermore, the detection unit that detects the amount of hydrazine fixed in the fixing unit based on the concentration values that are detected by these sensing units is provided. By detecting the concentration values from respective sensing units at the detection unit, the amount of hydrazine fixed in the fixing unit can be detected, and therefore the amount of hydrazine that is not fixed and drained along with drained water can be decreased. As a result, hydrazine can be used effectively, and therefore the fuel cell system can be designed as an efficient and economic system.

BEST MODE FOR CARRYING OUT THE INVENTION

I. Device Configuration

Figure 1:
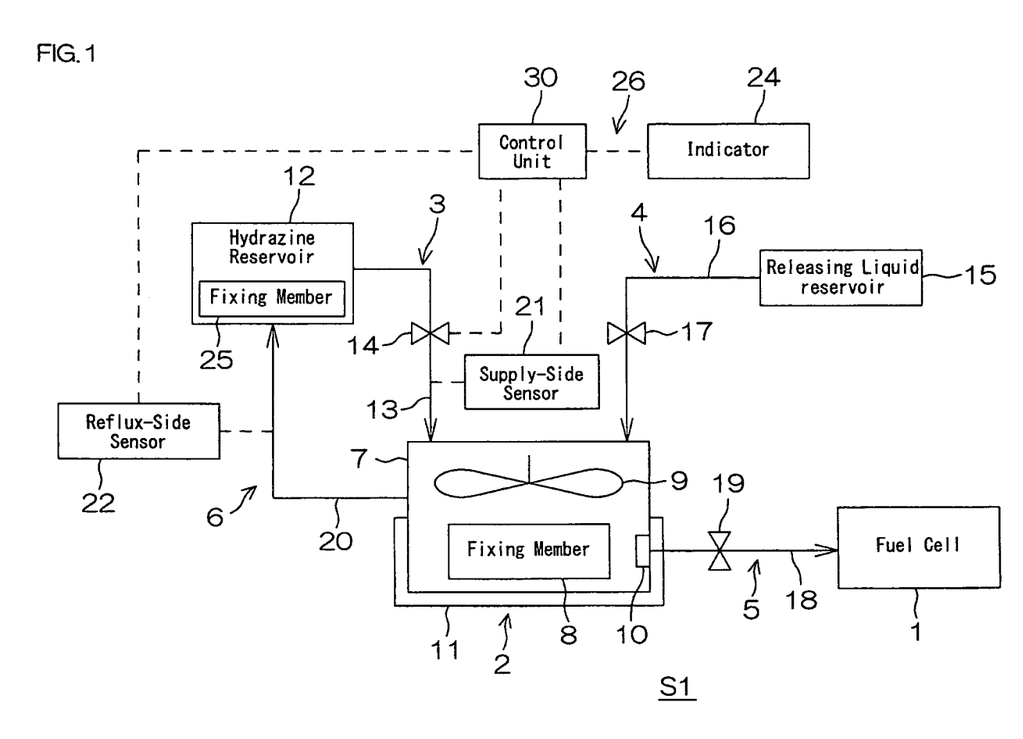
FIG. 1 is a schematic diagram illustrating the configuration of an embodiment of a fuel cell system of the present invention.

FIG. 1 is a schematic diagram illustrating the configuration of an embodiment of a fuel cell system of the present invention.

In FIG. 1, a fuel cell system S1 includes a fuel cell 1 to which hydrazine is supplied as fuel, a fixing unit 2 that fixes hydrazine, a hydrazine supply unit 3 that supplies hydrazine to the fixing unit 2, a releasing liquid supplying unit 4 that supplies water-based releasing liquid to the fixing unit 2, a fuel supply unit 5 that supplies hydrazine as fuel from the fixing unit 2 to the fuel cell 1, a reflux unit 6 for refluxing hydrazine from the fixing unit 2 to the hydrazine supply unit 3, and a detection unit 26 that detects the amount of hydrazine that is fixed in the fixing unit 2.

(A) Fixing Unit

The fixing unit 2 includes a casing 7, and a fixing member 8 that is stored in the casing 7.

The casing 7 is a container that stores the fixing member 8, and is formed of a material resistant to hydrazine (alkali-resistant), for example, stainless steel, polyethylene, polypropylene, and polytetrafluoroethylene (PTFE).

In the casing 7, a stirrer 9 is provided. With the stirrer 9, hydrazine and water-based releasing liquid supplied into the casing 7 are properly stirred.

A filter 10 is also provided in the casing 7, at a portion where a fuel supply line 18 (mentioned later) is connected. The filter 10 is formed of a separation membrane that separates hydrazine from the fixing member 8 based on their molecule size (for example, known molecular sieve membrane such as an ultrafilter membrane), or a filtering material that is capable of capturing impurities and degraded, floating resin in the casing 7. The filter 10 prevents the fixing member 8, impurities and degraded, floating resin from flowing out to the fuel supply line 18 (mentioned later).

On the casing 7, a heater 11 that covers the peripheral surface of the casing 7 is provided. The heater 11 is formed of, for example, a jacket capable of properly adjusting the temperature in the casing 7 by circulation of a heating medium.

The fixing member 8 is stored in the casing 7. The fixing member 8 is made of a synthetic resin that fixes and releases hydrazine (in the following, referred to as a fixing resin), and has a hydrazine-fixing group that releasably fixes hydrazine.

Although the hydrazine-fixing group is not particularly limited as long as it can fix hydrazine, examples thereof include a ketone group, a formyl group, an acetal group, a halogenomethyl group, a halogenoalkyl group, an amide group, an ester group, a sulfonyl chloride group, an amidino group, and a quaternary ammonium group.

Then, when hydrazine is releasably fixed to the hydrazine-fixing group, a hydrazine-releasable group is formed.

The hydrazine-releasable group is not particularly limited as long as it releasably fixes hydrazine, and examples thereof include hydrazone group ($C=N-NH_2$), hydrazide group ($-CONH-NH_2$), hydrazino group ($C-NH-NH_2$), and azine group ($-C=N-N=C-$).

It is preferable that hydrophilicity is imparted to the fixing resin because hydrazine is hydrophilic. Hydrophilicity is imparted to the fixing resin, for example, by introducing a hydrophilic unit such as polyoxyethylene into the main chain, or by introducing, for example, a hydrophilic group such as a hydroxyl group, a carboxyl group, a sulfonic acid group, a phosphoric acid group, an amide group, and a quaternary ammonium group into a side chain branched from the main chain.

Examples of the fixing resin, and fixing of hydrazine to and releasing of hydrazine from the fixing resin will now be described in detail.

(1) Hydrocarbon-Based Fixing Resin

A hydrocarbon-based fixing resin can be obtained by homopolymerizing a hydrazine fixing group-containing vinyl monomer, or by copolymerizing a hydrazine fixing group-containing vinyl monomer and a copolymerizable vinyl monomer that is copolymerizable with the hydrazine fixing group-containing vinyl monomer.

(1-1) Synthesis of Hydrocarbon-Based Fixing Resin

The hydrazine fixing group-containing vinyl monomer is a monomer having both a hydrazine-fixing group and a vinyl group, and examples thereof include acrolein, methyl vinyl ketone, ethyl vinyl ketone, hexyl vinyl ketone, p-acetyl methyl styrene, p-acetyl styrene, methyl acrylate, p-chloromethyl styrene, o-acetyl methyl vinyl alcohol, o-acetyl methyl allyl alcohol, and N-acetyl methyl vinyl pyridine. These hydrazine fixing group-containing vinyl monomers can be used alone or in combination of two or more.

The copolymerizable vinyl monomer is not particularly limited as long as it has a vinyl group and is copolymerizable with a hydrazine fixing group-containing vinyl monomer, and examples thereof include styrene and derivatives thereof such as styrene, o-methylstyrene, m-methylstyrene, p-methylstyrene, α-methylstyrene, p-chlorostyrene, 3,4-dichlorostyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene; (meth) acrylate derivatives such as methyl(meth)acrylate, ethyl (meth)acrylate, isopropyl(meth)acrylate, n-butyl(meth) acrylate, t-butyl(meth)acrylate, isobutyl(meth)acrylate, n-octyl(meth)acrylate, 2-ethylhexyl(meth)acrylate, stearyl (meth)acrylate, lauryl(meth)acrylate, and phenyl(meth)acrylate; olefins such as ethylene, propylene, and isobutylene; halogen-based vinyl monomers such as vinyl chloride, vinylidene chloride, vinyl bromide, vinyl fluoride, and vinylidene fluoride; vinyl esters such as vinyl propionate, vinyl acetate, and vinyl benzoate; vinyl ethers such as methyl vinyl ether and ethyl vinyl ether; N-vinyl compounds such as N-vinyl carbazole, N-vinyl indole, and N-vinyl pyrrolidone; aromatic vinyl monomers such as vinylnaphthalene and vinylpyridine; and acrylic acid and derivatives thereof such as acrylonitrile, methacrylonitrile, and acrylamide. These copolymerizable vinyl monomers can be used alone or in combination of two or more.

As described above, it is preferable that a hydrophilic vinyl monomer is copolymerized as the copolymerizable vinyl monomer to impart hydrophilicity to the hydrocarbon-based fixing resin.

Hydrophilic vinyl monomer is a monomer having both an ionic dissociation group such as a carboxyl group, a sulfonic acid group, and a phosphoric acid group, and a vinyl group, and examples thereof include acrylic acid, methacrylic acid, maleic acid, itaconic acid, cinnamic acid, fumaric acid, maleic acid monoalkyl ester, itaconic acid monoalkyl ester, styrene sulfonic acid, allyl sulfosuccinic acid, 2-acrylamide-2-methylpropanesulfonic acid, acid phosphoxy ethyl methacrylate, and 3-chloro-2-acid phosphoxypropyl methacrylate. These hydrophilic vinyl monomers can be used alone or in combination of two or more.

Further, as the copolymerizable vinyl monomer, a crosslinking vinyl monomer can also be copolymerized to impart mechanical strength to the hydrocarbon-based fixing resin. The crosslinking vinyl monomer is a monomer having a plurality of vinyl groups, and examples thereof include divinylbenzene, N,N'-methylene-bis(meth)acrylamide, ethyleneglycol di(meth)acrylate, polyethylene glycol di(meth) acrylate, propyleneglycol di(meth)acrylate, glycerin (di- or tri-)acrylate, trimethylolpropane triacrylate, neopentylglycol di(meth)methacrylate, triallylamine, triallyl cyanurate, triallyl isocyanurate, tetraaryloxy ethane, and pentaerythritol triallyl ether. These crosslinking vinyl monomers can be used alone or in combination of two or more.

The hydrocarbon-based fixing resin can be obtained by mixing a hydrazine fixing group-containing vinyl monomer as an essential component, and a copolymerizable vinyl monomer (preferably, hydrophilic vinyl monomer, and for a crosslinking vinyl monomer) as an optional component, and performing radical polymerization thereof.

The amount of the copolymerizable vinyl monomer mixed with the hydrazine fixing group-containing vinyl monomer is properly selected according to the amount of hydrazine supply and physical properties required for the resin, and for example, the equivalent ratio of the copolymerizable vinyl monomer to the fixing group in the hydrazine-fixing group-containing vinyl monomer is 1:0.01-100, preferably 1:0.1-10, or more preferably 1:0.5-2. More specifically, the equivalent ratio of the hydrophilic vinyl monomer to the fixing group in the hydrazine fixing group-containing vinyl monomer is, for example, 1:0.01-100, preferably 1:0.1-10, or more preferably 1:0.5-2. The amount of the crosslinking vinyl monomer is in the range of, for example, 0.1 to 100 parts by weight, or preferably 1 to 10 parts by weight, per 100 parts by weight of the total of the hydrazine fixing group-containing vinyl monomer and the hydrophilic vinyl monomer.

The radical polymerization is not particularly limited, and can be performed, for example, by adding a radical polymerization initiator and using a known method such as aqueous solution polymerization method or reverse phase suspension polymerization method.

The radical polymerization initiator is not particularly limited, and examples thereof include azo-based polymerization initiators such as 2,2'-azobis-(2,4-dimethylvaleronitrile), 2,2'-azobis(isobutyronitrile), 1,1'-azobis(cyclohexane-1-carbonitrile), 2,2'-azobis-4-methoxy-2,4-dimethylvaleronitrile, azobis(isobutyronitrile), and 2,2'-azobis(2-amidinopropane); peroxide-based polymerization initiators such as benzoyl peroxide, methyl ethyl ketone peroxide, diisopropylperoxy carbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine; persulfate such as potassium persulfate and ammonium persulfate; and redox-based initiators of hydrogen peroxide and reducing agents (ascorbic acid, etc.) combined.

In the radical polymerization, the reaction temperature is not particularly limited as long as it is higher than the radical formation temperature of the above-mentioned radical polymerization initiator, and is in the range of, for example, −10 to 200° C., or preferably 10 to 100° C. The use of a redox-based initiator, however, enables polymerization at approximately room temperature.

(1-2) Fixation of Hydrazine to Hydrocarbon-Based Fixing Resin

Hydrazine is fixed to the hydrocarbon-based fixing resin, for example, by adding an appropriate amount (preferably an equivalent amount or more) of hydrazine from a material supply line 13 (mentioned later) to a fixing group (a ketone group) in the hydrocarbon-based fixing resin, then warming the mixture with a heater 11 to a temperature, for example, from room temperature to 100° C., and stirring the mixture with a stirrer 9, for example, for 10 minutes to 48 hours. Hydrazine is thus fixed to the fixing group (the ketone group).

(1-3) Release of Hydrazine from Hydrocarbon-Based Fixing Resin

The hydrazine is released from the hydrocarbon-based fixing resin, for example, by supplying a water-based releasing liquid from the releasing liquid supplying unit 4 into the casing 7. The hydrocarbon-based fixing resin is dispersed by the water-based releasing liquid, and the hydrazine is thus released from the hydrocarbon-based fixing resin.

Examples of the water-based releasing liquid include water and an aqueous alkaline solution (for example, an aqueous NaOH solution, an aqueous KOH solution, etc.).

(2) Polyacrylamide-Based Fixing Resin

A polyacrylamide-based fixing resin can be obtained by radically polymerizing acrylamide.

(2-1) Synthesis of Polyacrylamide-Based Fixing Resin

A polyacrylamide-based fixing resin can be synthesized by mixing acrylamide with water to prepare an aqueous acrylamide solution, and adding a radical polymerization initiator to the aqueous acrylamide solution to radically polymerize the acrylamide.

Thereafter, for example, alcohol is added to the polyacrylamide to form a precipitate, and the precipitate is separated by filtration, so that a polyacrylamide-based fixing resin is obtained.

(2-2) Fixation of Hydrazine to Polyacrylamide-Based Fixing Resin

Hydrazine is fixed to the polyacrylamide-based fixing resin by adding an appropriate amount (preferably an equivalent amount or more) of hydrazine from the material supply line 13 (mentioned later) to a fixing group (an amide group) in the polyacrylamide-based fixing resin, and stirring the mixture in the same manner as described above. The hydrazine is fixed to the fixing group (the amide group), and thus polyacrylic acid hydrazide is obtained.

(2-3) Release of Hydrazine from Polyacrylamide-Based Fixing Resin

The hydrazine is released from the polyacrylamide-based fixing resin, for example, by supplying a water-based releasing liquid from the releasing liquid supplying unit 4 into the casing 7. The polyacrylamide-based fixing resin is dispersed by the water-based releasing liquid, and the hydrazine is thus released from the polyacrylamide-based fixing resin.

Examples of the water-based releasing liquid include water and an aqueous alkaline solution (for example, an aqueous NaOH solution, an aqueous KOH solution, etc.).

(3) Poly(meth)acrylate-Based Fixing Resin

A poly (meth)acrylate-based fixing resin can be obtained by first radically polymerizing (meth)acrylate ester.

(3-1) Synthesis of Poly(meth)acrylate-Based Fixing Resin

A poly (meth)acrylate-based fixing resin can be obtained by adding a radical polymerization initiator to (meth)acrylate ester to allow polymerization. The obtained poly(meth)acrylate-based fixing resin is finely pulverized and stored in the casing 7.

(3-2) Fixation of Hydrazine to Poly(meth)acrylate-Based Fixing Resin

Hydrazine is fixed to the poly (meth)acrylate-based fixing resin by adding an equivalent amount or more of hydrazine from the material supply line 13 (mentioned later) to a fixing group (an ester group) in the poly (meth)acrylate-based fixing resin, and stirring the mixture in the same manner as described above. The hydrazine is fixed to the fixing group (the ester group), and thus polyacrylic acid hydrazide is obtained.

(3-3) Release of Hydrazine from Poly(meth)acrylate-Based Fixing Resin

The hydrazine is released from the poly (meth)acrylate-based fixing resin, for example, by supplying a water-based releasing liquid from the releasing liquid supplying unit 4 into the casing 7. The poly(meth)acrylate-based fixing resin is dispersed by the water-based releasing liquid, and the hydrazine is thus released from the poly(meth)acrylate-based fixing resin.

Examples of the water-based releasing liquid include water and an aqueous alkaline solution (for example, an aqueous NaOH solution, an aqueous KOH solution, etc.).

(4) Polyvinyl Alcohol-Based Fixing Resin

A polyvinyl alcohol-based fixing resin can be obtained by copolymerizing a hydrazine fixing group-containing vinyl monomer and vinyl acetate to synthesize a hydrazine fixing group-containing polyvinyl acetate copolymer, and then saponifying the synthesized product.

(4-1) Synthesis of Polyvinyl Alcohol-Based Fixing Resin

The hydrazine fixing group-containing vinyl monomer is a monomer having both a hydrazine-fixing group and a vinyl group, and examples thereof include alkyl or aryl vinyl ketone such as methyl vinyl ketone and ethyl vinyl ketone; p-acetyl alkyleneoxy styrene such as p-acetyl methyleneoxy styrene and p-acetyl ethyleneoxy styrene; and p-chloromethyl styrene. These hydrazine fixing group-containing vinyl monomers can be used alone or in combination of two or more.

The copolymerization of the hydrazine fixing group-containing vinyl monomer and the vinyl acetate is performed by mixing them with a proper solvent (for example, alcohols), and then adding a radical polymerization initiator thereto to perform radical polymerization.

The radical polymerization is not particularly limited and can be performed in the same manner as above. As the radical polymerization initiator, for example, an azo-based polymerization initiator or a peroxide-based polymerization initiator is used.

Thereafter, for example, a polymerization terminator (for example, nitrobenzene, etc.) is added thereto to terminate the polymerization. Thereafter, an unreacted monomer is distilled off with adding alcohols to form a precipitate in water, and the precipitate is separated by filtration to obtain a hydrazine fixing group-containing polyvinyl acetate.

Subsequently, the hydrazine fixing group-containing polyvinyl acetate is mixed with a solvent (for example, alcohols). Then, an alkali (for example, an aqueous NaOH solution, an aqueous KOH solution, etc.) is added and saponified, to form a precipitate in water again. The precipitate is isolated and dried, so that a polyvinyl alcohol-based fixing resin is obtained.

(4-2) Fixation of Hydrazine to Polyvinyl Alcohol-Based Fixing Resin

Hydrazine is fixed to the polyvinyl alcohol-based fixing resin by adding an appropriate amount (preferably an equivalent amount or more) of hydrazine from the material supply line 13 (mentioned later) to a fixing group (a ketone group, a halogeno group, a formyl group, an amide group, an ester group, etc.) in the polyvinyl alcohol-based fixing resin, and stirring the mixture in the same manner as described above. Hydrazine is thus fixed to the fixing group (the ketone group, the halogeno group, the formyl group, the amide group, the ester group, etc.).

(4-3) Release of Hydrazine from Polyvinyl Alcohol-Based Fixing Resin

The hydrazine is released from the polyvinyl alcohol-based fixing resin, for example, by supplying a water-based releasing liquid from the releasing liquid supplying unit 4 into the casing 7. The polyvinyl alcohol-based fixing resin is dispersed by the water-based releasing liquid, and the hydrazine is thus released from the polyvinyl alcohol-based fixing resin.

Examples of the water-based releasing liquid include water and an aqueous alkaline solution (for example, an aqueous NaOH solution, an aqueous KOH solution, etc.).

(5) Polyester-Based Fixing Resin

A polyester-based fixing resin can be obtained by first performing condensation polymerization of a hydrazine fixing group-containing polyhydric alcohol and polybasic acid. The polyester-based fixing resin can also be obtained by performing condensation polymerization of polyhydric alcohol and the hydrazine fixing group-containing polybasic acid. The polyester-based fixing resin can also be obtained by performing condensation polymerization of the hydrazine fixing group-containing polyhydric alcohol (and polyhydric alcohol, if necessary) and the hydrazine fixing group-containing polybasic acid (polybasic acid, if necessary).

(5-1) Synthesis of Polyester-Based Fixing Resin

The hydrazine fixing group-containing polyhydric alcohol is a polyhydric alcohol having both a hydrazine-fixing group and at least two hydroxyl groups, and examples thereof include acetylethyl ethylene glycol. If necessary, for example, a polyhydric alcohol such as ethylene glycol, propylene glycol, butylene glycol, and neopentyl glycol can also be used together.

The polybasic acid has at least two carboxylic acids, and examples thereof include aromatic polybasic acid such as orthophthalic acid, isophthalic acid, terephthalic acid, and trimellitic acid; and aliphatic polybasic acid such as adipic acid, azelaic acid, and sebacic acid. The hydrazine fixing group-containing polybasic acid may be contained in polybasic acid.

The polyester-based fixing resin can be obtained by mixing the hydrazine fixing group-containing polyhydric alcohol (and polyhydric alcohol, if necessary) and the polybasic acid, and performing condensation copolymerization.

The hydrazine fixing group-containing polyhydric alcohol (and polyhydric alcohol, if necessary) and the polybasic acid may be mixed in nearly equivalent amounts, and a known organic metal catalyst is added during the condensation polymerization. The reaction can be performed at a temperature in the range of, for example, 30 to 300° C., or preferably 50 to 250° C., and in the case where the material has poor stability, the reaction can be performed under reduced pressure.

(5-2) Fixation of Hydrazine to Polyester-Based Fixing Resin

Hydrazine is fixed to the polyester-based fixing resin by adding an appropriate amount (preferably an equivalent amount or more) of hydrazine from the material supply line 13 to a fixing group (a ketone group, a halogeno group, a formyl group, an amide group, an ester group, etc.) in the polyester-based fixing resin, and stirring the mixture in the same manner as described above. Hydrazine is thus fixed to the fixing group (the ketone group, the halogeno group, the formyl group, the amide group, the ester group, etc.).

(5-3) Release of Hydrazine from Polyester-Based Fixing Resin

The hydrazine is released from the polyester-based fixing resin, for example, by supplying a water-based releasing liquid from the releasing liquid supplying unit 4 into the casing 7. The polyester-based fixing resin is dispersed by the water-based releasing liquid, and the hydrazine is thus released from the polyester-based fixing resin.

Examples of the water-based releasing liquid include water and an aqueous alkaline solution (for example, an aqueous NaOH solution, an aqueous KOH solution, etc.).

(6) Polyamide-Based Fixing Resin

A polyamide-based fixing resin can be obtained by polymerizing polyvalent amine and polybasic acid (however, at least one of polyvalent amine and polybasic acid needs to contain the hydrazine-fixing group).

To be specific, the polyamide-based fixing resin can be obtained by synthesizing aliphatic polyamide by performing condensation polymerization of aliphatic polyvalent amine and aliphatic polybasic acid; aromatic ring-containing polyamide by performing condensation polymerization of aromatic polyvalent amine and aliphatic polybasic acid; aromatic ring-containing polyamide by performing condensation polymerization of aliphatic polyvalent amine and aromatic polybasic acid; and aromatic ring-containing polyamide by performing condensation polymerization of aromatic polyvalent amine and aromatic polybasic acid.

(6-1) Synthesis of Polyamide-Based Fixing Resin

The aliphatic polyvalent amine has at least two amino groups, and examples thereof include ethylenediamine, hexamethylenediamine, and cyclohexanediamine.

The aromatic polyvalent amine has at least two amino groups in the aromatic ring, and examples thereof include meta-xylylene diamine, para-xylylene diamine, phenylene diamine, diaminodiphenyl ether, and diaminodiphenyl methane.

The aliphatic polybasic acid has at least two carboxylic acids, and examples thereof include adipic acid, suberic acid, azelaic acid, sebacic acid, dodecanedioic acid, hexahydroterephthalic acid, and hexahydroisophthalic acid.

The aromatic polybasic acid has at least two carboxylic acids in the aromatic ring, and examples thereof include terephthalic acid, isophthalic acid, 2-methylterephthalic acid, 5-methylisophthalic acid, and 2,6-naphthalene dicarboxylic acid.

The polymerization of the polyvalent amine and the polybasic acid can be performed by mixing them in nearly equivalent amounts, and if necessary, reducing pressure under an inert gas atmosphere to allow the mixture to react. The reaction temperature is in the range of, for example, 30 to 400° C., or preferably 70 to 300° C.

Subsequently, the obtained polymer is dissolved in a proper solvent (for example, N-methylpyrrolidone); and formaldehyde and hydrochloric acid, hydrobromic acid, or hydroiodic acid are then added thereto to introduce the halogenomethyl group. Thereafter, a precipitate is formed in a proper solvent (for example, alcohols), so that a polyamide-based fixing resin is obtained.

Although the polyamide-based fixing resin can be used as is, the halogenomethyl group can be converted to an acetylethyl group by further dissolving the polyamide-based fixing resin in a proper solvent (for example, N-methylpyrrolidone), adding an equivalent amount or more of acetone to the halogenomethyl group, adding alkaline (for example, an aqueous NaOH solution, an aqueous KOH solution, etc.), and stirring.

Further, a ketone group can also be introduced into the side chain by allowing a ketone compound having an active hydrogen such as methyl alkyl ketone, methyl allyl ketone, or methyl aralkyl ketone to react with the polyamide-based fixing resin. Further, a ketone group can also be introduced into the side chain by allowing halogenoacetone, halogenomethyl alkyl ketone, halogenoallyl ketone, or halogenoaralkyl ketone to directly react with the polyamide-based fixing resin.

(6-2) Fixation of Hydrazine to Polyamide-Based Fixing Resin

Hydrazine is fixed to the polyamide-based fixing resin by adding an equivalent amount or more of hydrazine from the material supply line 13 to a fixing group (a ketone group, a halogenomethyl group, etc.) in the polyamide-based fixing resin, and stirring the mixture in the same manner as described above. Hydrazine is thus fixed to the fixing group (the ketone group, the halogenomethyl group, etc.).

(6-3) Release of Hydrazine from Polyamide-Based Fixing Resin and Supply of Hydrazine The hydrazine is released from the polyamide-based fixing resin, for example, by supplying a water-based releasing liquid from the releasing liquid supplying unit 4 into the casing 7. The polyamide-based fixing resin is dispersed by the water-based releasing liquid, and the hydrazine is thus released from the polyamide-based fixing resin.

Examples of the water-based releasing liquid include water and an aqueous alkaline solution (for example, an aqueous NaOH solution, an aqueous KOH solution, etc.).

(7) Polyether-Based Fixing Resin

A polyether-based fixing resin can be obtained by polymerizing a phenolic derivative in the presence of a copper catalyst and a base to synthesize an aromatic ring-containing polyether, and then allowing the aromatic ring of the aromatic ring-containing polyether to be halogenomethylated.

(7-1) Synthesis of Polyether-Based Fixing Resin

Examples of the phenolic derivative include 2,6-dimethylphenol and 2,6-diphenylphenol.

The phenolic derivative is polymerized by dissolving, if necessary, the phenolic derivative in a solvent such as nitrobenzene; adding, for example, a copper catalyst such as copper chloride (I) and copper chloride (II) and a base such as pyridine thereinto; and bringing in oxygen with stirring to allow the mixture to react. The reaction temperature is in the range of, for example, 50 to 400° C., or preferably, 60 to 200° C. Thereafter, the resulting product is washed with a proper solvent (chloroform or methanol) and dried under reduced pressure to obtain an aromatic ring-containing polyether.

Subsequently, the aromatic ring-containing polyether is dissolved in a proper solvent (for example, chloroform); and formaldehyde and hydrochloric acid, hydrobromic acid, or hydroiodic acid are then added thereto to introduce the halogenomethyl group into the aromatic ring of the aromatic ring-containing polyether. Thereafter, filtration is performed, so that a polyether-based fixing resin is obtained.

Although the polyether-based fixing resin can be used as is, the halogenomethyl group can be converted to, for example, an acetylethyl group by further dissolving the polyether-based fixing resin in a proper solvent (for example, chloroform), adding an equivalent amount or more of acetone to the halogenomethyl group, adding alkaline (for example, an aqueous NaOH solution, an aqueous KOH solution, etc.), and stirring. Further, a ketone group-containing side chain such as an acetyl methyl group can also be introduced by allowing mono-chloroacetone, mono-chloromethyl alkyl ketone, mono-chloromethyl allyl ketone, or mono-chloromethyl aralkyl ketone to react.

(7-2) Fixation of Hydrazine to Polyether-Based Fixing Resin

An appropriate amount (preferably an equivalent amount or more) of hydrazine is added from the material supply line 13 to a fixing group (a ketone group, a halogenomethyl group, etc.) in the polyether-based fixing resin, and the mixture is stirred in the same manner as described above. Hydrazine is thus fixed to the fixing group (the ketone group, the halogenomethyl group, etc.).

(7-3) Release of Hydrazine from Polyether-Based Fixing Resin and Supply of Hydrazine The hydrazine is released from the polyether-based fixing resin, for example, by supplying a water-based releasing liquid from the releasing liquid supplying unit 4 into the casing 7. The polyether-based fixing resin is dispersed by the water-based releasing liquid, and the hydrazine is thus released from the polyether-based fixing resin.

Examples of the water-based releasing liquid include water and an aqueous alkaline solution (for example, an aqueous NaOH solution, an aqueous KOH solution, etc.).

(8) Polyether Ketone-Based Fixing Resin

A polyether ketone-based fixing resin can be obtained by polymerizing dihalogeno benzophenone and diphenol in the presence of alkali.

(8-1) Synthesis of Polyether Ketone-Based Fixing Resin

Examples of the dihalogeno benzophenone include 4,4'-dihalo benzophenone, 2,4'-dihalo benzophenone, bis-1,4-(4-halobenzoil)benzene, bis-1,3-(4-halobenzoil)benzene, bis-4,4'-(4-halobenzoil)biphenyl, bis-4,4'-(4-halobenzoil)diphenyl ether.

Examples of the diphenol include hydroquinone, 4,4'-dihydroxybiphenyl, 4,4'-dihydroxybenzophenone, bis(4-hydroxyphenyl)methane, 2,2-bis(4-hydroxyphenyl)propane, 4,4'-dihydroxydiphenyl ether, 4,4'-dihydroxydiphenyl sulfide, and 4,4'-dihydroxydiphenyl sulfone.

The polyether ketone-based fixing resin can be obtained by polymerizing dihalogeno benzophenone and diphenol in the presence of alkali.

Examples of the alkali include carbonates of alkali metal, carbonates of alkaline earth metal, bicarbonates of alkali metal, carbonates of alkaline earth metal, and hydroxides of alkali metal.

The dihalogeno benzophenone and the diphenol may be mixed in nearly equivalent amounts, and a known catalyst and a known solvent are added during the polymerization. The reaction temperature is in the range of, for example, 10 to 300° C., or preferably, 50 to 200° C.

Examples of the catalyst include metal oxides, metal halides, and metal salts, and examples of the metal include copper and chromium. The catalyst also includes phyllosilicates such as silica.

Examples of the solvent include aliphatic sulfones such as dimethyl sulfone, diethyl sulfone, and sulfolane; aromatic sulfones such as diphenyl sulfone, ditolyl sulfone, methylphenyl sulfone, dibenzothiophene oxide, phenoxathiin dioxide, and 4-phenylsulfonyl biphenyl; and aromatic ketones such as benzophenone, isophthalophenone, terephthalophenone, 4-benzoyldiphenylether, fluorenone, xanthone, and thioxanthone.

Although the polyether ketone-based fixing resin can be used as is, in order to further introduce a ketone group into the side chain, the polyether ketone-based fixing resin can be halogenomethylated and reacted with acetone, methyl alkyl ketone, methyl allyl ketone, or methyl aralkyl ketone, and for example, an acetylethyl group can also be introduced thereinto. Further, by allowing mono-halogenomethyl alkyl ketone such as mono-chloroacetone, mono-halogenomethyl allyl ketone, or mono-halogenoaralkyl ketone to react therewith to introduce, for example, an acetyl methyl group, hydrazine can also be introduced to the ketone group.

(8-2) Fixation of Hydrazine to Polyether Ketone-Based Fixing Resin

Hydrazine is fixed to the polyether ketone-based fixing resin by adding an appropriate amount (preferably an equivalent amount or more) of hydrazine from the material supply line 13 to a fixing group (a ketone group, a halogenomethyl group, etc.) in the polyether ketone-based fixing resin, and stirring the mixture in the same manner as described above. Hydrazine is thus fixed to the fixing group (the ketone group, the halogenomethyl group, etc.).

(8-3) Release of Hydrazine from Polyether Ketone-Based Fixing Resin

The hydrazine is released from the polyether ketone-based fixing resin, for example, by supplying a water-based releasing liquid from the releasing liquid supplying 4 into the casing 7. The polyether ketone-based fixing resin is dispersed by the water-based releasing liquid, and the hydrazine is thus released from the polyether ketone-based fixing resin.

Examples of the water-based releasing liquid include water and an aqueous alkaline solution (for example, an aqueous NaOH solution, an aqueous KOH solution, etc.).

(9) Polythioether-Based Fixing Resin

A polythioether-based fixing resin can be obtained by allowing dihalogenobenzene and sodium sulfide to react to synthesize an aromatic ring-containing polythioether, and then allowing the aromatic ring of the aromatic ring-containing polythioether to be halogenomethylated.

(9-1) Synthesis of Polythioether-Based Fixing Resin

Examples of the dichlorobenzene include p-dichlorobenzene.

The reaction of the dihalogenobenzene and the sodium sulfide is performed, first by dissolving the sodium sulfide in a polar solvent such as N-methylpyrrolidone, heating the mixture to decompose the sodium sulfide into hydrogen sulfide, and then afterwards, adding dihalogenobenzene to allow the mixture to react. The reaction temperature is in the range of, for example, 5 to 200° C., or preferably, 25 to 150° C. Thereafter, the resulting product is washed with a proper solvent (for example, alcohols) and dried to obtain an aromatic ring-containing polythioether.

Subsequently, the aromatic ring-containing polythioether is dissolved in a proper solvent (for example, dimethyl sulfoxide); and formaldehyde and hydrochloric acid, hydrobromic acid, or hydroiodic acid are then added thereto to introduce the halogenomethyl group into the aromatic ring of the aromatic ring-containing polyether. Thereafter, filtration is performed, so that a polythioether-based fixing resin is obtained.

Although the polythioether-based fixing resin may be used as is, the polythioether-based fixing resin may further be dissolved in a proper solvent (for example, dimethylsulfoxide), after which an equivalent or more of acetone, methyl alkyl ketone, methyl allyl ketone, or methyl aralkyl ketone with respect to the halogenomethyl group, and further alkaline (for example, an aqueous NaOH solution, an aqueous KOH solution, etc.) are added and stirred, to convert the halogenomethyl group to, for example, an acetylethyl group.

(9-2) Fixation of Hydrazine to Polythioether-Based Fixing Resin

Hydrazine is fixed to the polythioether-based fixing resin by adding an appropriate amount (preferably an equivalent amount or more) of hydrazine from the material supply line 13 to a fixing group (a ketone group, a halogenomethyl group, etc.) in the polythioether-based fixing resin, and stirring the mixture in the same manner as described above. Hydrazine is thus fixed to the fixing group (the ketone group, the halogenomethyl group, etc.).

(9-3) Release of Hydrazine from Polythioether-Based Fixing Resin

The hydrazine is released from the polythioether-based fixing resin, for example, by supplying a water-based releasing liquid from the releasing liquid supplying unit 4 into the casing 7. The polythioether-based fixing resin is dispersed by the water-based releasing liquid, and the hydrazine is thus released from the polyether ketone-based fixing resin.

Examples of the water-based releasing liquid include water and an aqueous alkaline solution (for example, an aqueous NaOH solution, an aqueous KOH solution, etc.).

(B) Hydrazine Supply Unit

The hydrazine supply unit 3 includes a hydrazine reservoir 12 that reserves hydrazine, a fixing member 25 stored in the hydrazine reservoir 12, and a material supply line 13 that supplies hydrazine from the hydrazine reservoir 12 to the casing 7.

The hydrazine reservoir 12 is a tank that reserves hydrazine, and is formed of a material resistant to hydrazine (alkali-resistant), for example, stainless steel, polyethylene, polypropylene, polytetrafluoroethylene (PTFE), etc.

The fixing member 25 is stored in the hydrazine reservoir 12. The fixing member 25 is made of a synthetic resin that fixes and releases hydrazine (in the following, referred to as a fixing resin), and is made of the same synthetic resin as, for example, the above-described fixing member 8. Although not shown in FIG. 1, the hydrazine reservoir 12 may be provided with members corresponding to the above-described stirrer 9, filter 10, and heater 11.

Hydrazine includes both hydrazine monohydrate (hydrazine hydrate), and anhydrous hydrazine.

The material supply line 13 is made of a pipe formed of a material that is the same as the above-described material, and is connected with the hydrazine reservoir 12 and the casing 7.

A material-side valve 14 is provided in the middle of the material supply line 13.

The hydrazine supply unit 3 further includes a supply-side sensor 21 (first sensing unit).

The supply-side sensor 21 is disposed in the material supply line 13, detects a hydrazine concentration of an aqueous hydrazine solution flowing in the material supply line 13, and inputs the concentration value into a control unit 30 (mentioned later). Examples of the supply-side sensor 21 include IR sensor (infrared sensor) that measures infrared absorbance of hydrazine by, for example, infrared spectroscopy, and a known concentration sensor can be used.

(C) Releasing Liquid Supplying Unit

The releasing liquid supplying unit 4 includes a releasing liquid reservoir 15 that reserves a water-based releasing liquid, and a releasing liquid supply line 16 that supplies the water-based releasing liquid from the releasing liquid reservoir 15 to the casing 7.

The releasing liquid reservoir 15 is a tank that reserves the water-based releasing liquid, and is formed of a material that is resistant to the water-based releasing liquid (alkali-resistant), for example, stainless steel, polyethylene, polypropylene, and polytetrafluoroethylene (PTFE).

The water-based releasing liquid is water or an aqueous solution for releasing hydrazine that is fixed to the fixing member 8, and as described above, examples thereof include water, and aqueous alkaline solutions such as an aqueous NaOH solution and an aqueous KOH solution.

The releasing liquid supply line 16 is a pipe formed of a material that is the same as the above-described one, and is connected with the releasing liquid reservoir 15 and the casing 7. A releasing liquid-side valve 17 is provided in the middle of the releasing liquid supply line 16.

(D) Fuel Supply Unit

The fuel supply unit 5 includes a fuel supply line 18 formed of a material that is the same as the above-described one that connects the casing 7 and the fuel cell 1. A fuel-side valve 19 is provided in the middle of the fuel supply unit 5.

(E) Fuel Cell

The fuel cell 1 is not particularly limited as long as it uses hydrazine as fuel, and examples thereof include a polymer electrolyte fuel cell such as the one described in International Publication WO 2003/056649 (ref: Patent Document 2).

A polymer electrolyte fuel cell is equipped with a unit cell in which a fuel-side electrode and an oxygen-side electrode are disposed to oppose each other on both sides of a polymer membrane, and a plurality of the unit cells are stacked to form a stack structure.

Hydrazine is allowed to flow into the fuel-side electrode of the fuel cell 1 from the fuel supply line 18 along with the water-based releasing liquid (water or an aqueous alkaline solution). Oxygen (air) is allowed to flow into the oxygen-side electrode. This causes a reaction of the formula below, generating an electromotive force.

$$NH_2NH_2+H_2O+O_2 \rightarrow N_2+3H_2O$$

Afterwards, nitrogen generated in the above-described reaction and water (water contains alkaline when the water-based releasing liquid contains alkaline) are drained as drained water.

(F) Reflux Unit

The reflux unit 6 includes a reflux line 20 (drain line) that connects the casing 7 with the hydrazine reservoir 12, and a reflux-side sensor 22.

The reflux-side sensor 22 is disposed in the reflux line 20, and detects a hydrazine concentration of the aqueous hydrazine solution (drained water) that flows in the reflux line 20, and inputs the concentration value into a control unit 30 (mentioned later). For the reflux-side sensor 22, for example, a sensor that is the same as the above-described supply-side sensor 21 can be used.

(G) Detection Unit

The detection unit 26 includes a control unit 30 for detecting the amount of hydrazine fixed to the fixing member 8, and an indicator 24 for displaying the amount of the detected hydrazine.

In the control unit 30, calibration curve data for detecting the amount of hydrazine fixed to the fixing member 8 based on, for example, a difference of a concentration value (supply-side concentration value) inputted from the supply-side sensor 21 and a concentration value (reflux-side concentration value) inputted from the reflux-side sensor 22, is built in. That is, the more the difference of the concentration values is, the smaller the amount of hydrazine fixed to the fixing member 8 is, and the smaller the difference of the concentration values is, the more the amount of hydrazine fixed to the fixing member 8 is, and therefore a calibration curve is made, for example, by plotting the concentration difference so that the maximum amount of hydrazine the fixing member 8 can fix is 100%, and the minimum amount thereof is 0%. The control unit 30 detects the amount of hydrazine by referring to the calibration curve data based on the supply-side concentration value and the reflux-side concentration value. Then, the amount of hydrazine detected is shown on the indicator 24.

The indicator 24 is a device that enables checking of the hydrazine amount, and for example, devices such as a display unit that enables visual checking, and such a display unit provided with a speaker capable of guiding by voice may be used. The indicator 24 is electrically connected with the control unit 30, and operates by input signals from the control unit 30.

In the fuel cell system S1, a known solution sending pump is properly provided in the material supply line 13, the releasing liquid supply line 16, the fuel supply line 18, and the reflux line 20 when, for example, gravitational transportation is difficult, although depending on the system layout.

II. Operational Advantage

In the following, operational advantage of the fuel cell system S1 in this embodiment is described.

In the fuel cell system S1, hydrazine is fixed in advance to the fixing member 25 in the hydrazine reservoir 12, for example. When a water-based releasing liquid is supplied to the hydrazine reservoir 12, the hydrazine fixed to the fixing member 25 is released (a first releasing step). Then, the material-side valve 14 is opened for a predetermined time period and with a predetermined opening degree. This allows hydrazine to be supplied from the hydrazine reservoir 12 to the casing 7 along with the water-based releasing liquid as an aqueous hydrazine solution ($N_2H_4.H_2O$) via the material supply line 13 (a first hydrazine supply step). Then, in the casing 7, a part of the hydrazine is fixed to the fixing member 8 based on the fixation conditions of the kind of the fixing resin (hydrazine fixing step). For example, when the fixing member 8 is made of a synthetic resin containing methyl vinyl ketone, a reaction of the formula below is caused, thereby fixing a part of the hydrazine to the fixing member 8, and generating water.

$$CH_3COCHCH_2+N_2H_4.H_2O \rightarrow CH_3CN_2H_2+2H_2O$$

Then, the hydrazine that was not fixed in the casing 7 is drained along with the water generated by the fixation as an aqueous hydrazine solution to the reflux line 20, thereby being refluxed to the hydrazine reservoir 12 (an aqueous hydrazine solution refluxing step). Then, in the hydrazine reservoir 12, the hydrazine fixed to the fixing member 25 is released by the water-based releasing liquid and water contained in the refluxed aqueous hydrazine solution (reflux water) (second releasing step).

Then, released hydrazine is supplied to the casing 7 along with the refluxed aqueous hydrazine solution via the material supply line 13 (second hydrazine supplying step). Afterwards, the above-described hydrazine fixing step, aqueous hydrazine solution refluxing step, second releasing step, and second hydrazine supplying step are performed continuously.

In the first and second hydrazine supplying steps, the concentration of the hydrazine that flows in the material supply line 13 is inputted to the control unit 30 from the supply-side sensor 21. On the other hand, in the hydrazine refluxing step, the concentration of the hydrazine that flows in the reflux line 20 is inputted from the reflux-side sensor 22 to the control unit 30.

The control unit 30 detects the amount of the hydrazine fixed to the fixing member 8 based on the concentration value (supply-side concentration value) inputted from the supply-side sensor 21 and the concentration value (reflux-side concentration value) inputted from the reflux-side sensor 22. For example, when the supply-side concentration value and the reflux-side concentration value are the same (when the difference of the supply-side concentration value and the reflux-side concentration value is zero), by referring to the calibration curve data, it is determined that the hydrazine fixed to the fixing member 8 is full (no more hydrazine can be fixed). Then, the control unit 30 determines that the hydrazine fixed to the fixing member 8 is full or is in a predetermined amount, and displays such on the indicator 24.

As described above, in the fuel cell system S 1, the hydrazine supplied to the casing 7 can be fixed to the fixing member 8 until the hydrazine is supplied to the fuel cell 1, and therefore hydrazine can be reserved stably in the casing 7. As a result, hydrazine can be used safely.

Furthermore, in the fuel cell system S1, the supply-side sensor 21 is provided in the material supply line 13, the reflux-side sensor 22 is provided in the reflux line 20, and the sensors 21 and 22 are electrically connected with the control unit 30. By inputting the concentration values (supply-side concentration value and reflux-side concentration value) detected by the sensors 21 and 22 to the control unit 30, the amount of the hydrazine fixed to the fixing member 8 can be detected, and therefore the amount of the hydrazine that is drained without being fixed can be decreased. As a result, effective use of an aqueous hydrazine solution (hydrazine) can be achieved, and therefore the fuel cell system S1 can be designed as an efficient and economic system.

Further, in the fuel cell system S1, the reflux line 20 allows the aqueous hydrazine solution drained from the casing 7 to be refluxed to the hydrazine reservoir 12, and therefore water contained in the refluxed aqueous hydrazine solution (reflux water) can be used for releasing hydrazine from the fixing member 25. The refluxed aqueous hydrazine solution can also be supplied to the casing 7 again. As a result, the aqueous hydrazine solution drained from the casing 7 can be used effectively without being wasted, and therefore the fuel cell system S1 can be designed as a further efficient and economic system.

The hydrazine fixed to the fixing member 8 is supplied to the fuel cell 1 by first opening the releasing liquid-side valve 17 for a predetermined time period and with a predetermined opening degree so as to suit the operation conditions of the fuel cell 1, to supply the water-based releasing liquid from the releasing liquid reservoir 15 to the casing 7 via the releasing liquid supply line 16. Then, in the casing 7, hydrazine is released from the fixing member 8 based on the release conditions of the kind of the fixing resin.

Then, by opening the fuel-side valve 19 for a predetermined time period and with a predetermined opening degree so as to suit the operation conditions of the fuel cell 1, hydrazine is supplied from the casing 7 along with the water-based releasing liquid to the fuel cell 1 via the fuel supply line 18. Then, in the fuel cell 1, electricity is generated as described above.

(On-Vehicle Embodiment)

Figure 2:
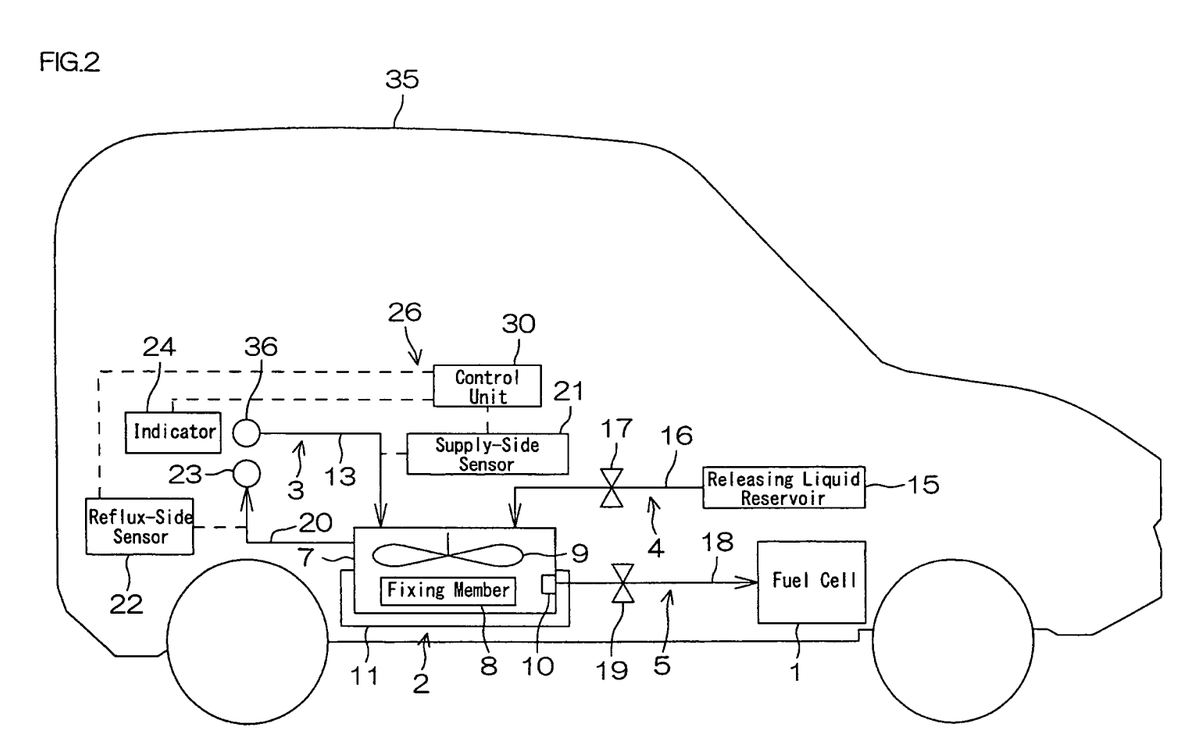
FIG. 2 is a schematic diagram illustrating the fuel cell system of the embodiment shown in FIG. 1, when carried in a vehicle.

FIG. 2 is a schematic diagram illustrating the fuel cell system S1 of the embodiment shown in FIG. 1, when carried in a vehicle. In FIG. 2, the same reference numerals are used for the members that are the same as the members in the above, and descriptions thereof are omitted.

In FIG. 2, when the fuel cell system S1 is mounted on a vehicle, the hydrazine supply unit 3 is not equipped with the hydrazine reservoir 12, and is equipped with only the material supply line 13 (not equipped with the material-side valve 14), the supply-side sensor 21, and the control unit 30. An upstream-side of the material supply line 13 is connected with a supply port 36 at a rear side of a vehicle 35. The supply port 36 is normally closed with a lid.

In the detection unit 26, the indicator 24 is provided in the proximity of the rear side of the supply port 36. That is, when the fuel cell system S1 is mounted on a vehicle, the indicator 24 is disposed at a position that enables a person (supplier) who supplies hydrazine at a material supply station (mentioned later) to check the amount of hydrazine.

Further, in the reflux unit 6, a downstream side of the reflux line 20 is connected with a reflux port 23 provided in the proximity of a lower side of the supply port 36. The reflux port 23 is normally closed with a lid.

When the fuel cell system S1 is mounted on a vehicle, the hydrazine reservoir 12 is provided at a material supply station. In the vehicle, when the hydrazine fixed in the fixing unit 2 is in an empty state, a supplier injects an aqueous hydrazine solution from the hydrazine reservoir 12 to the material supply line 13 via the supply port 36 at the material supply station. Then, in the injected aqueous hydrazine solution, the hydrazine that was not fixed to the fixing member 8 is refluxed from the reflux port 23 to the material supply station along with water generated by the fixation via the reflux line 20. Thereafter, the supplier checks if the hydrazine fixed to the fixing member 8 is full or in a predetermined amount with the indicator 24, and stops the supplying of hydrazine.

In the vehicle 35, the fuel cell 1 is disposed at a front side of the vehicle 35. The fuel cell 1 is electrically connected with a motor (not shown), and electric power generated by the fuel cell 1 is transmitted to the motor, and converted to driving force for the vehicle 35 by the motor.

The casing 7 is disposed at a side slightly rear with respect to the center of the vehicle 35 in the anteroposterior direction. The releasing liquid reservoir 15 is disposed at an upper side of the fuel cell 1.

When the fuel cell system S1 is mounted on a vehicle, for example, hydrazine is supplied at a material supply station while the vehicle is stopped (at the time when electricity is not generated) to fix hydrazine to the fixing member 8, and when driving (during electric power generation), the water-based releasing liquid is supplied to the casing 7 from the releasing liquid reservoir 15 to release hydrazine, thereby supplying hydrazine to the fuel cell 1.

Although an embodiment of the present invention has been discussed above, the present invention can also be embodied in a different manner.

For example, in the above embodiment, the hydrazine reservoir 12 in which the fixing member 25 is stored is given as an example of a hydrazine supply source, and it is described that hydrazine is fixed in the hydrazine reservoir 12. However, for example, in another embodiment, with the hydrazine reservoir 12 in which the fixing member 25 is not stored, hydrazine can be reserved in the hydrazine reservoir 12 in an aqueous solution state. In the case of such a configuration, the aqueous hydrazine solution refluxed via the reflux line 20 can be reserved in the hydrazine reservoir 12 in an aqueous hydrazine solution state. The aqueous hydrazine solution can be supplied to the casing 7 again without being reserved. That is, such a configuration also achieves effective use of the aqueous hydrazine solution drained from the casing 7 without being wasted. Further, instead of the reflux line 20, a drain line can be connected with the casing 7, so that the aqueous hydrazine solution is discarded as is without being refluxed to the hydrazine reservoir 12 or the casing 7.

SPECIFIC EXAMPLES

While in the following, the above-described fixing resin is described in further detail with reference to Specific Examples, the present invention is not limited to any of them by no means.

Specific Example 1

Hydrocarbon-Based Amide Crosslinking Fixing Resin (Fixing Group: Ketone Group)

1) Synthesis of Hydrocarbon-Based Amide Crosslinking Fixing Resin

An amount of 20 g of methyl vinyl ketone, 59 g of sodium p-styrene sulfonate, 2.3 g of methylene-bis-acrylamide as a crosslinking agent, and 79 g of ion exchange water were uniformly mixed to prepare an aqueous polymerization solution, and the aqueous polymerization. solution was supplied into a polymerization tank. The dissolved oxygen content in the aqueous polymerization solution was set to 0.2 ppm by introduction of nitrogen gas into the aqueous polymerization solution, and the solution temperature was set to 5° C.

To this aqueous polymerization solution, 10 g of 0.1% hydrogen peroxide, 5 g of a 0.1% aqueous ascorbic acid solution, and 2.3 g of V-50 (azo-based polymerization initiator, manufactured by Wako Pure Chemical Industries, Ltd.) were added. After approximately 20 minutes, a temperature rise indicating initiation of polymerization was confirmed. Subsequently, the temperature was increased to 65° C., and the polymerization was continued at the temperature for approximately 8 hours, to obtain a hydrated gel-like polymer.

The hydrated gel-like polymer thus obtained was pulverized into small pieces using a meat chopper, and the resulting small pieces of the hydrated gel polymer were through air dried under the conditions of a supply air temperature of 120° C. and an air velocity of 1.5 m/sec for 70 minutes using an aeration-type hot air dryer (manufactured by Inoue Kinzoku Kogyo Co., Ltd.), to obtain a dried product having a moisture content of approximately 4%.

The dried product was pulverized with a mixer for household use and sieved off to collect a portion of the pulverized material which passed through a 22-mesh wire net (710 μm in diameter) but not through a 100-mesh wire net (125 μm in diameter), so that a hydrophilic fixing resin (hydrocarbon-based amide crosslinking fixing resin (fixing group: ketone group)) was obtained.

The absorption magnification of the hydrophilic fixing resin was 9 times its mass. The absorption magnification was obtained in the following manner. One gram of the hydrophilic fixing resin was placed in a tea bag (20 cm long and 10 cm wide) made of a 250 mesh nylon net. The bag was immersed in physiological saline (an aqueous ion exchange solution containing 0.90% NaCl) for 60 minutes. Thereafter, the bag was hung up for 15 minutes to drain water. Residual water was then removed by centrifugal drying, and the bag was measured for the increased mass.

2) Fixation of Hydrazine to Hydrocarbon-Based Amide Crosslinking Fixing Resin

To the hydrophilic fixing resin obtained in step 1) above was added a 100% hydrazine hydrate containing hydrazine in twice the molar amount of the ketone group contained in 2 g of the resin, and the mixture was stirred and reacted for 60 minutes, so that the hydrazine was fixed to the hydrophilic fixing resin, thereby obtaining a hydrophilic fixing resin.

After completion of the reaction, 40 ml of isopropyl alcohol was added thereto, and the mixture was stirred for 1 hour, filtered, and washed. The hydrophilic fixing resin was then separated by filtration and dried under reduced pressure. The content of hydrazine in the isopropyl alcohol filtrate was quantified by HPLC. As a result, the content of free hydrazine was 45.9%. That is, the content of fixed hydrazine was 54.1%. This corresponds to a hydrazine adsorption ratio of 108.2% based on the initial content of the ketone group in the resin.

3) Release of Hydrazine from Hydrocarbon-Based Amide Crosslinking Hydrazine Fixing Resin 3-1) Release with Alkali An amount of 0.8 g of the hydrophilic fixing resin obtained in step 2) above was dispersed and stirred in a 1 N aqueous KOH solution at room temperature. The content of hydrazine in the 1 N aqueous KOH solution was quantified by HPLC. As a result, the content of the hydrazine was 72.1%.

3-2) Re-Fixation

To the hydrophilic fixing resin from which the hydrazine was released in step 3-1) above was added a 100% hydrazine hydrate containing hydrazine in twice the molar amount of the ketone group contained in 0.6 g of the resin, and the mixture was stirred and reacted for 60 minutes, so that the hydrazine was fixed to the hydrophilic fixing resin, thereby obtaining a hydrophilic fixing resin again.

After completion of the reaction, 40 ml of isopropyl alcohol was added thereto, and the mixture was stirred for 1 hour, filtered, and washed. The hydrophilic hydrazine fixing resin was then separated by filtration and dried under reduced pressure. The content of hydrazine in the isopropyl alcohol filtrate was quantified by HPLC. As a result, the content of free hydrazine was 64.8%. That is, the content of fixed hydrazine was 50.8% based on the content of the ketone group. This corresponds to a 70.4% hydrazine conversion ratio relative to the residual ketone group before the re-fixation.

3-3) Release with Water

An amount of 0.8 g of the hydrophilic fixing resin obtained in step 2) above was dispersed and stirred in water at room temperature. The content of hydrazine in water was quantified by HPLC. The result confirmed that 72.8% of the fixed hydrazine was released.

This corresponds to a 78.8% hydrazine conversion ratio relative to the initial ketone group.

Specific Example 2

Hydrocarbon-Based Amide Crosslinking Fixing Storage Resin (Fixing Group: Ketone Group)

1) Fixation of Hydrazine to Hydrocarbon-Based Amide Crosslinking Fixing Resin

To the hydrophilic fixing resin obtained in step 1) of Specific Example 1 was added hydrazine in an equimolar amount to the ketone group contained in the resin, and the same procedures as in step 2) of Specific Example 1 were performed. The result showed that the content of hydrazine in the isopropyl alcohol filtrate was 13.9%. That is, the content of the fixed hydrazine was 86.1%. This corresponds to a hydrazine adsorption ratio of 86.1% based on the initial content of the ketone group in the resin.

2) Release of Hydrazine from Hydrocarbon-Based Amide Crosslinking Fixing Storage Resin An amount of 0.8 g of the hydrophilic fixing storage resin obtained in step 1) above was dispersed and stirred in a 1 N aqueous KOH solution at room temperature. The content of hydrazine in the 1 N aqueous KOH solution was quantified by HPLC. As a result, the content of the hydrazine was 18.8%. This corresponds to 21.8% of the released hydrazine based on the initial content of the ketone group.

Specific Example 3

Hydrocarbon-Based Ether Crosslinking Fixing Resin

1) Synthesis of Hydrocarbon-Based Ether Crosslinking Fixing Resin

A hydrophilic fixing resin (hydrocarbon-based ether crosslinking fixing resin) was obtained by the same procedures as in step 1) of Specific Example 1, except that pentaerythritol triallyl ether was used in place of N,N'-methylene-bis-acrylamide.

The absorption magnification of the hydrophilic fixing resin was 0.1 times its mass.

2) Fixation of Hydrazine to Hydrocarbon-Based Ether Crosslinking Fixing Resin

To the hydrophilic fixing resin obtained in step 1) above was added a 100% hydrazine hydrate containing hydrazine in an equimolar amount to the ketone group contained in 2 g of the resin, and the mixture was stirred and reacted for 60 minutes, so that the hydrazine was fixed to the hydrophilic fixing resin, thereby obtaining a hydrophilic fixing resin.

After completion of the reaction, the reaction product was washed with 40 ml of isopropyl alcohol.

The hydrophilic fixing resin was then separated by filtration and dried under reduced pressure. The content of hydrazine in the isopropyl alcohol filtrate was quantified by HPLC. As a result, the content of free hydrazine was 13.0%. That is, the content of fixed hydrazine was 87.0%.

3) Release of Hydrazine from Hydrocarbon-Based Ether Crosslinking Fixing Resin

An amount of 0.8 g of the hydrophilic fixing resin obtained in step 2) above was dispersed and stirred in a 1 N aqueous KOH solution at room temperature for 60 minutes. Subsequently, after 40 ml of methanol was added thereto to gelate the hydrophilic fixing resin, the gelated hydrophilic fixing resin was separated by filtration, and the content of hydrazine in the alcohol filtrate was quantified by HPLC. The result confirmed that 19.4% of the fixed hydrazine was released. This corresponds to a 22.3% hydrazine conversion ratio relative to the initial ketone group.

Specific Example 4

Hydrocarbon-Based Amide Crosslinking Fixing Resin (Fixing Group Aldehyde Group)

An amount of 16 g of acrolein, 59 g of sodium p-styrene sulfonate, 2.3 g of methylene-bis-acrylamide as a crosslinking agent, and 79 g of ion exchange water were uniformly mixed to prepare an aqueous polymerization solution, and the aqueous polymerization solution was supplied into a polymerization tank. The dissolved oxygen content in the aqueous polymerization solution was set to 0.2 ppm by introduction of nitrogen gas into the aqueous polymerization solution, and the solution temperature was set to 5° C.

To this aqueous polymerization solution, 10 g of 0.1% hydrogen peroxide, 5 g of a 0.1% aqueous ascorbic acid solution, and 2.3 g of V-50 (azo-based polymerization initiator, manufactured by Wako Pure Chemical Industries, Ltd.) were added. After approximately 20 minutes, a temperature rise indicating initiation of polymerization was confirmed. Subsequently, the temperature was increased to 65° C., and the polymerization was continued at the temperature for approximately 8 hours, to obtain a hydrophilic fixing resin made of water-soluble polymers (a hydrocarbon-based amide crosslinking fixing resin (fixing group: aldehyde group)).

A 60% hydrazine hydrate aqueous solution in a molar amount equivalent to the aldehyde group contained in the hydrophilic fixing resin thus obtained was added, stirred and reacted for 30 minutes, so that hydrazine was fixed to the hydrophilic fixing resin, thereby obtaining a hydrophilic fixing resin. To this reaction solution was added 100 g of methanol and stirred to solidify the hydrophilic fixing resin. The solidified hydrophilic hydrazine fixing resin was separated by filtration, and dried under reduced pressure. Although the content of hydrazine in the methanol filtrate was quantified by iodometry, free hydrazine was not detected. That is, 100% of the hydrazine was fixed (reacted and became hydrazone).

Then, water was added to the hydrophilic hydrazine fixing resin thus separated and dried, and the mixture was stirred. The hydrophilic fixing resin was separated using a molecular sieve membrane which allows molecules having a molecular weight of 1000 or less to pass through. As a result of quantifying the amount of the filtrate by HPLC, free hydrazine was detected in an amount equivalent to 97.7% of the hydrazine fixed as hydrazone.

Specific Example 5

Acrylamide-Based Fixing Resin

Ten grams of acrylamide and 25.9 ml of water were mixed to prepare an aqueous acrylamide solution. Thereto was added 4.1 g of a 35% hydrogen peroxide and the mixture was stirred at 85 to 90° C. for 16 hours. The reaction solution was injected into a 10-fold amount of methanol to form a white precipitate, and the precipitate was separated by filtration. Thereafter, the precipitate was dried to obtain polyacrylamide (average molecular weight: 22,000).

Ten grams of the polyacrylamide thus obtained and 17 ml of water were mixed to prepare an aqueous polyacrylamide solution. Thereto was added 21.12 g of a 100% hydrazine hydrate and stirred at 80 to 85° C. for 15 hours. The reaction solution was injected into a 10-fold amount of methanol to form a white precipitate. The precipitate was separated by filtration and dried to obtain a polyacrylic acid hydrazide (acrylamide-based fixing resin). The polyacrylic acid hydrazide thus obtained had an average molecular weight of 23,000 and a hydrazide conversion ratio of 82%.

This polyacrylic acid hydrazide was dissolved in a 1 N aqueous KOH solution in an amount equal to or more than the molar amount of the polyacrylic acid hydrazide. This hydrolyzed hydrazide to release the hydrazine hydrate. Thereafter, as a result of HPLC analysis, free hydrazine in an amount equivalent to 14.7% of the hydrazine fixed as hydrazide was detected. The polyacrylic acid hydrazide was converted to a potassium polyacrylate.

Specific Example 6

Vinyl Alcohol-Based Fixing Resin

A 500 ml-three-neck flask was equipped with a stirrer, a capacitor, and a thermometer, and charged with 86 g of vinyl acetate, 152 g of p-acetyl methyleneoxy styrene, and 50 ml of methanol. The hot-water bath temperature was increased to 60 to 63° C., while stirring the content.

When the mixture solution was boiled in the flask and reflux was confirmed, 0.10 g of AIBN (azobisisobutyronitrile, manufactured by Otsuka Chemical Co., Ltd.) preliminarily dissolved in 10 g of methanol was added. The mixture was immediately, foamed to initiate polymerization. The polymerization was continued as is for 5 hours, and a small amount of dinitrobenzene (polymerization terminator) was added to terminate the polymerization.

Subsequently, heating was continued while methanol was added dropwise, so that an unreacted monomer was distilled off. The solution containing polymers was injected into large quantities of water to form a precipitate of the polymers. The precipitate was then filtered and washed with diluted methanol and water. The resulting solid was dissolved in methanol, and a 1N aqueous KOH solution was added dropwise to the solution. The mixture was fully stirred to be saponified and then removed as potassium acetate. The solution containing the saponified polymer was injected into large quantities of iced water to isolate the polymer (solid).

The isolated polymer was dried under reduced pressure. Thereto was added a 60% hydrazine hydrate in a molar amount equivalent to the p-acetyl methyleneoxy styrene that was assumed to have completely reacted, and the mixture was stirred for 5 hours. The reaction solution was washed with methanol, filtered, and dried under reduced pressure, so that a vinyl alcohol-based fixing resin was obtained. The content of hydrazine hydrate in the filtrate was quantified by iodometry. The result confirmed that 43.8% of the stoichiometrical amount of the ketone group contained in the vinyl alcohol-based fixing resin was fixed as hydrazone.

A 1N KOH was added to the vinyl alcohol-based fixing resin and stirred. Subsequently, as a result of iodometry, free hydrazine was detected in an amount equivalent to 88.1% of the fixed hydrazine.

Specific Example 7

Polyester-Based Fixing Resin

A 500 ml-three-neck flask equipped with a rectifying column was charged with 75.5 g of terephthalic acid, 101.6 g of acetylethyl ethylene glycol, 0.075 g of titanate tetra-n-butylester, and 0.03 g of butyl hydroxytinoxide.

The mixture was fully stirred and the water thus generated was distilled off while maintaining the temperature at 220 to 250° C. The reaction mixture was esterified until it became transparent. The resulting product and 0.02 g of titanate tetra-n-butylester were charged into an autoclave, mixed, and heated at 250° C. under reduced pressure (1 mmHg) for 2 hours. The resulting condensate was dissolved in hexamethylphosphoramide (HMPA), and supplied into large quantities of water under strong stirring, so that the condensate was precipitated. The condensate was then filtered off, washed with methanol, and dried under reduced pressure.

To the condensate was added a 60% hydrazine hydrate in an equimolar amount to the ketone group (stoichiometrical amount) and stirring was performed a whole day. Methanol was added thereto and the condensate was filtered off. The condensate was further washed with methanol, and dried under reduced pressure, so that a polyester-based fixing resin was obtained. The content of hydrazine hydrate in the methanol filtrate was quantified by iodometry. As a result, the content of free hydrazine hydrate was 72.8%. That is, the content of fixed hydrazine hydrate was 27.2%.

This polyester-based fixing resin was dispersed in a 1 N aqueous KOH solution and stirred for 1 hour. Subsequently, the polyester-based fixing resin was filtered off, and the hydrazine in the filtrate was titrated by iodometry. As a result, free hydrazine in an amount equivalent to 80.5% of the fixed hydrazine was detected.

Specific Example 8

Polyamide-Based Fixing Resin-1

A test tube equipped with a nitrogen introducing tube and a cock for reducing pressure was charged with 9.91 g of 4,4'-diaminodiphenyl methane and 10.62 g of sebacic acid, and the mixture was heated to 285° C. under a nitrogen gas stream to be melted. Then, the reaction system was decompressed to approximately 1.33 kPa and allowed to react for 1 hour. Then, the reaction system was again cooled to room temperature at normal pressure under a nitrogen gas stream. Subsequently, the test tube was broken and the obtained polyamide was pulverized with a pulverizer. The pulverized powder was dissolved in N-methylpyrrolidone and washed with water. When the resulting solution was supplied into large quantities of methanol, a condensate powder was precipitated out. This condensate was dissolved in N-methylpyrrolidone, and formalin in twice the molar amount equivalent to the condensate and hydrochloric acid were added and stirred and reacted for 5 hours (thus, two chloromethyl groups were introduced into the 4,4'-diaminodiphenyl methane). This reaction product was supplied into large quantities of methanol, to obtain a chloromethylated condensate powder.

This condensate was dissolved in N-methylpyrrolidone; acetone was added in an excessive amount relative to the 4,4'-diaminodiphenyl methane; and a 1 N aqueous KOH solution in twice the molar amount equivalent to the 4,4'-diaminodiphenyl methane was further added dropwise under stirring. After completion of the reaction, the reaction solution was supplied into large quantities of methanol, to obtain a condensate powder. In this condensate, an average of one acetylethyl group was introduced into the aromatic ring of the aromatic ring-aliphatic polyamide.

A 60% hydrazine hydrate in a molar amount equivalent to the carbonyl group was added to the condensate powder and stirred for 2 hours. The resulting mixture was then supplied into methanol. This forms a powdery precipitate having a hydrazone group. This solid was filtered off and dried under reduced pressure, to obtain a polyamide-based fixing resin having a hydrazine-releasable group (hydrazone group).

Specific Example 9

Polyamide-Based Fixing Resin-2

A chloromethylated condensate powder was obtained by the same procedures as in Specific Example 8. Thereafter, a 60% hydrazine hydrate in an equimolar amount to the chloromethyl group in the condensate was added and stirred for 2 hours. The resulting mixture was then supplied into methanol, to form a precipitate having a hydrazinomethyl group (polyamide-based fixing resin). The content of the precipitate was quantified by iodometry, and the hydrazino group was confirmed in an amount equivalent to 76.8% of the stoichiometrically calculated amount thereof.

Specific Example 10

Polyether-Based Fixing Resin-1

A 500 ml-three-neck flask equipped with a stirrer, an oxygen introducing tube, and a thermometer was placed in a water bath at 30° C., and 200 ml of nitrobenzene, 70 ml of pyridine, and 1 g of copper(I) chloride were added thereto. Oxygen was brought thereinto while vigorously stirring, and 15 g of 2,6-dimethylphenol was added. When the temperature was increased to 33° C., the reaction mixture obtained viscousness. The reaction was further continued for 12 minutes, and thereafter, the reaction mixture was diluted with 100 ml of chloroform and supplied into 1.1 L of methanol containing 3 ml of concentrated hydrochloric acid. The precipitated condensate was filtered off and washed with 250 ml of methanol, 250 ml of methanol containing 10 ml of concentrated hydrochloric acid, and 250 ml of methanol, in this order. The condensate was further dissolved in 500 ml of chloroform, and supplied into 1.2 L of methanol containing 3 ml of concentrated hydrochloric acid to form a precipitate again. The resulting condensate was washed with methanol and then dried under reduced pressure at 110° C. for 3 hours Thus, polyphenylene ether was obtained. The yield of polyphenylene ether was 91% and the average molecular weight thereof was 28000.

Ten grams of the polyphenylene ether was dissolved in 100 ml of chloroform. Then, formalin in 4 times the molar equivalent amount of the aromatic ring in the polyphenylene ether was added thereto under stirring, and concentrated hydrochloric acid was then added dropwise. The mixture was further stirred for 2 hours, and then supplied into large quantities of methanol. This precipitated a solid (polymer) in which the aromatic ring of the polyphenylene ether was chloromethylated.

The solid was filtered off, washed with methanol, and then dried under reduced pressure. The resulting solid was dissolved in chloroform, and caustic soda and acetone in 4 times the molar amount of the aromatic ring in the polymer were added thereto and stirred for 2 hours. The reaction solution was supplied into large quantities of methanol, to obtain a solid having an acetylethyl group introduced in the aromatic ring of the polymer. The solid was filtered off, and then dried under reduced pressure. A 60% hydrazine hydrate in an amount equivalent to the stoichiometrical amount for the above reaction was added to the solid and the mixture was stirred for 3 hours. Subsequently, the mixture was washed with methanol and filtered. The solid thus filtered was dried under reduced pressure, so that a polyether-based fixing resin was obtained. The content of hydrazine in the methanol filtrate was quantified by iodometry. As a result, it was confirmed that the content of fixed hydrazine was 51.5%.

Specific Example 11

Polyether-Based Fixing Resin-2

A chloromethylated solid (polymer) was obtained by the same procedures as in Specific Example 10. Thereafter, a 60% hydrazine hydrate in 4 times the molar equivalent amount of the aromatic ring in the polymer was added and stirred for 3 hours. The resulting mixture was then supplied into methanol, to form a precipitate having a hydrazinomethyl group (polyether-based fixing resin). The content of the precipitate was quantified by iodometry. The result confirmed a hydrazino group in an amount equivalent to 68.6% of the stoichiometrically calculated amount thereof.

Specific Example 12

Polyether Ketone-Based Fixing Resin

A 1 L-stainless steel reaction tube equipped with a stirrer, a nitrogen introducing tube, and an outlet tube was charged with 125 g of 4,4'-dichlorobenzophenone, 59.2 g of fine powder of sodium carbonate, 10 g of silica (Aerosil) as a catalyst, 0.27 g of copper(II) chloride, and 300 g of diphenyl sulfone as a solvent.

The reaction system was replaced by nitrogen, and thereafter, the mixture was heated to 200° C. Again, the atmosphere therein was replaced by nitrogen, and stirring was started. The temperature was increased and the reaction was performed at 280° C. for 2 hours, at 300° C. for 1 hour, and at 320° C. for another 2 hours. A small amount of nitrogen was flown downward during condensation. After completion of the reaction, the cooled and solidified condensate was taken out. This solid (condensate) was pulverized with a mixer, and then washed several times with acetone, 4% caustic soda, and water to remove the solvent and the catalyst. When the resulting solid was dried, powder of aromatic polyether ketone was quantitatively obtained.

Ten grams of the powder was dispersed in 100 ml of dimethyl sulfoxide, and pulverized into fine powder having an average particle size of 300 nm with an ultra high pressure collision pulverizer (a jet mizer, manufactured by Sugino Machine Limited). A 60% hydrazine hydrate in a molar equivalent to the carbonyl group in the condensate obtained from the calculated value was added to the dispersion containing the fine powder, and the mixture was stirred at 100° C. a whole day. The condensate was filtered off, washed with acetone and water, and then dried. Thus, a polyether ketone-based fixing resin was obtained.

Then, a 1 N KOH was added to the polyether ketone-based fixing resin, and the mixture was stirred at 60° C. for 2 hours. Then, as a result of iodometry, free hydrazine was detected in an amount equivalent to 28.9% of the fixed hydrazine.

Specific Example 13

Polythioether-Based Fixing Resin-1

An autoclave with an internal capacity of 2 L equipped with a stirrer was charged with 480 g of N-methylpyrrolidone and 2.7 g of sodium sulfide, heated under stirring, and dehydrated until the internal temperature reached 120° C. An amount of 79.3 g of a distillate mainly composed of water was distilled off. At this time, 0.069 mol of sodium sulfide was decomposed into hydrogen sulfide and disappeared.

Then, 2.0 mol of p-dichlorobenzene and 150 g of N-methylpyrrolidone were added and stirred over 1 hour while the temperature was increased to 250° C. The reaction was further performed at 250° C. for 3 hours, and thereafter, some slurry was sampled and analyzed. The conversion was 100%. An amount of 150 g of N-methylpyrrolidone was then added, and the mixture was allowed to stand for 15 minutes under stirring at 250° C. Thereafter, the reaction product was cooled to terminate the reaction. The resulting slurry was thoroughly washed with methanol and warm water, then dried at 100° C. overnight, to obtain a solid (polyphenylene sulfide). The resulting solid had a particle size of 22 meshes or less.

The polyphenylene sulfide thus obtained was dissolved in dimethyl sulfoxide, and formalin in a molar amount equivalent to the molecularity of the aromatic ring contained in the polyphenylene sulfide and hydrochloric acid were added dropwise to perform chloromethylation. The reaction solution was supplied into large quantities of methanol, to obtain a solid. The solid was filtered off, washed with methanol, water, and methanol, and dried under reduced pressure a whole day. The resulting solid was dissolved in dimethyl sulfoxide, and acetone was added in an amount equal to or more than the molar amount of the chloromethyl group. Subsequently, an equimolar amount of aqueous caustic soda solution was added and stirred at 60° C. for 5 hours. The reaction solution was then supplied into large quantities of methanol to obtain a solid. The solid was filtered off and thoroughly washed with methanol, water, and methanol. The resulting solid was dried under reduced pressure a whole day. IR and NMR confirmed that the resulting solid was a polymer having an acetylethyl group introduced in the aromatic ring of the polyphenylene sulfide.

This polymer was dissolved in dimethyl sulfoxide, and a 60% hydrazine hydrate in an equimolar amount to the carbonyl group was added and stirred for 10 hours. The separated solid was filtered off, and washed with methanol to obtain a polythioether-based fixing resin. The content of hydrazine in the methanol filtrate was quantified by iodometry. As a result, it was confirmed that the content of fixed hydrazine was 60.3%.

Then, a 1 N KOH was added to the polythioether-based fixing resin and stirred. Subsequently, iodometry was performed. As a result, free hydrazine was detected in an amount equivalent to 42.9% of the fixed hydrazine.

Specific Example 14

Polythioether-Based Fixing Resin-2

A chloromethylated solid was obtained by the same procedures as in Specific Example 13. Thereafter, this solid was dissolved in the dimethyl sulfoxide, and a 60% hydrazine hydrate in an equimolar amount to the chloromethyl group in the solid was added and stirred for 5 hours. The resulting mixture was then supplied into methanol to form a precipitate having a hydrazinomethyl group (polythioether-based fixing resin). The content of the precipitate was quantified by HPLC. The result confirmed a hydrazino group in an amount equivalent to 58.5% of the stoichiometrically calculated amount thereof.

Specific Example 15

Activity Measurement of Fuel-Side Electrode of the Fuel Cell Using Hydrazine as a Fuel Released from the Acrylamide-Based fixing Resin 1) Preparation of Test Solution and Standard Solution To 2 g of the polyacrylic acid hydrazide obtained in Specific Example 5 was added 38 g of 1 N KOH to prepare a 5% by weight 1 N aqueous KOH solution of polyacrylic acid hydrazide. The solution thus prepared was dissolved by heating at 70° C. for 30 minutes, and then cooled to room temperature, so that the obtained solution was considered as a test solution.

2) Activity Measurement of Fuel-Side Electrode

Using an electrochemical analyzer (manufactured by BAS, Inc.), the activity of the fuel-side electrode was measured by LSV (linear sweep voltammetry) on the following measurement conditions. The results are shown in FIG. 3.

Figure 3:
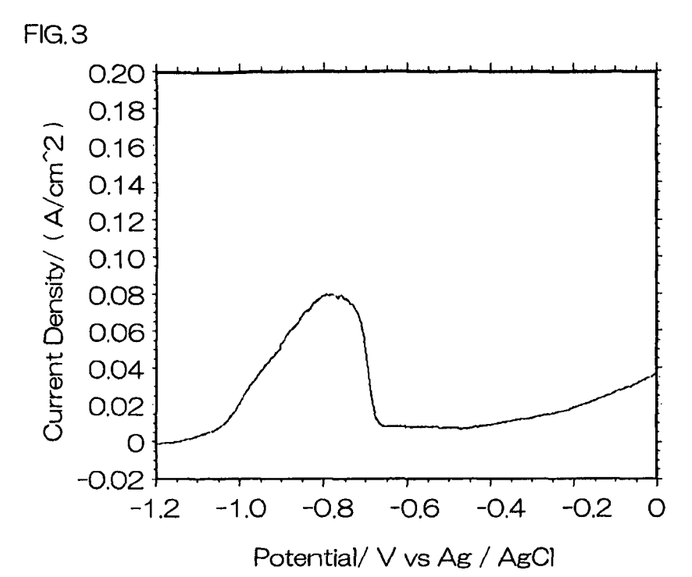
FIG. 3 is a graph illustrating results of activity measurement of the fuel-side electrode in Specific Example 15.

FIG. 3 shows that oxidation current has occurred by using as a fuel the hydrazine liberated from the test solution prepared in step 1) above.

Activity Measurement Conditions:

Test solution: 5% by weight of polyacrylic acid hydrazide/1 N aqueous KOH solution Fuel-Side Electrode: Co (cobalt) electrode (manufactured by BAS, Inc.)

Reference Electrode: Ag/AgCl (silver-silver chloride) electrode (manufactured by BAS, Inc.)

Counter Electrode: Pt (platinum) electrode (manufactured by BAS, Inc.)

Solution Temperature: 30 degrees

| Scanning Range | Scanning Rate |
| --- | --- |
| Pretreatment: −1.6-0.6 V | Pretreatment: 0.1 V/s |
| Blank measurement: −1.6-0 V | Blank measurement: 0.02 V/s |
| Activity measurement: −1.6-0 V | Activity measurement: 0.02 V/s |

Bubbling with Ar (argon) gas was performed before each measurement.

While the illustrative embodiments of the present invention are provided in the above description, such is for illustrative purpose only and it is not to be construed as limiting. Modification and variation of the present invention that will be obvious to those skilled in the art is to be covered by the following claims.

This application corresponds to Patent Application No. 2007-238280 filed in Japan on Sep. 13, 2007, the entire contents of which are incorporated herein by reference.

Industrial Applicability

As described above, a fuel cell system of the present invention may be widely applied in the field in which a fuel cell is used as a system, for example, in various industries of automobiles, railroad, aircrafts, etc. Particularly, because no carbon dioxide is generated and substantial zero emission can be achieved, the present invention can be suitably used as, for example, a fuel cell system to be carried on vehicles.

The invention claimed is:

1. A fuel cell system comprising:
a fixing unit that fixes or releases hydrazine, wherein the fixing unit comprises a casing and a fixing member disposed in the casing, and wherein the fixing member comprises a fixing resin having a hydrazine-fixing group that releasably fixes hydrazine, the hydrazine-fixing group being selected from at least one of a ketone group, a formyl group, an acetal group, a halogenomethyl group, a halogenoalkyl group, an amide group, an ester group, a sulfonyl chloride group, an amidino group, or a quaternary ammonium group,
a fuel cell to which hydrazine released in the fixing unit is supplied as fuel,
a supply line connected to the fixing unit and which supplies an aqueous hydrazine solution from a hydrazine supply source to the fixing unit,
a drained water drain line, which is separate from the supply line, connected to the fixing unit and which drains drained water from the fixing unit,
a first hydrazine concentration sensing unit configured to detect a hydrazine concentration in an aqueous hydrazine solution flowing in the supply line from said hydrazine supply source to said fixing unit, a second hydrazine concentration sensing unit configured to detect a hydrazine concentration in said drained water flowing in the drained water drain line, and a hydrazine amount detection unit configured to detect an amount of hydrazine fixed in the fixing unit based on the concentration values detected by the first hydrazine concentration sensing unit and the second hydrazine concentration sensing unit.

2. The fuel cell system according to claim 1, wherein the hydrazine amount detection unit is configured to determine that hydrazine fixed in the fixing unit is full when the concentration value detected by the first hydrazine concentration sensing unit and the concentration value detected by the second hydrazine concentration sensing unit are the same.

3. The fuel cell system according to claim 1, wherein the drained water drain line is a reflux line which refluxes drained water from the fixing unit to the hydrazine supply source.

4. The fuel cell system according to claim 1, further comprising:

a releasing liquid supply line which provides releasing liquid from a releasing liquid supply source to said fixing unit.

* * * * *